Patented Feb. 18, 1941

2,232,434

UNITED STATES PATENT OFFICE 2,232,434

TERPIN ESTERS

Joseph N. Borglin, Wilmington, Del., assignor to Hercules Powder Company, Wilmington, Del., a corporation of Delaware No Drawing. Application April 14, 1939,
Serial No. 267,913

13 Claims. (Cl. 260—489)

This invention relates to esters of terpin and to an improved method for their preparation.

Terpin is readily dehydrated upon heating to elevated temperatures and it has heretofore been found difficult to prepare the terpin diacetate in more than minor yields and impossible to prepare the corresponding propionate and butyrate.

Now, I have found that I can prepare the terpin esters of the lower fatty acids by reacting terpin with the anhydride of a lower fatty acid in the presence of a mild basic catalyst. In this way I have succeeded in preparing terpin dipropionate and terpin dibutyrate in good yields. I have also succeeded in preparing terpin diacetate in much better yields than have heretofore been obtained.

By the method in accordance with this invention, terpin is reacted with the anhydride of a lower fatty acid in the presence of a mildly basic catalyst.

The mildly basic catalyst which I utilize in this reaction may be a basic inorganic salt, such as, for example, sodium acetate, potassium acetate, sodium formate, potassium formate, sodium propionate, potassium propionate, sodium butyrate, potassium butyrate. Again, it may be a weak organic base, such as, for example, pyridine, quinoline, pyrrol, strychnine, tetrahydro quinoline, etc.

The anhydride of a lower fatty acid anhydride which I utilize may be, for example, acetic anhydride, propionic anhydride, butyric anhydride, etc.

The terpin utilized in this reaction can be conveniently obtained by the partial dehydration of terpin hydrate. Thus, for example, terpin may be obtained by heating terpin hydrate to a temperature of about 113° C. until the evolution of water ceases.

In carrying out the method in accordance with this invention, a mixture of terpin and the anhydride of a lower fatty acid anhydride is heated, preferably under reflux, to a temperature within the range of about 60° C. to about 175° C. and preferably within the range of about 125° C. to about 160° C. for a period of about 8 hours to about 120 hours. In carrying out this reaction stoichiometric proportions of the two reactants may be used, but in general I prefer to use an excess of the anhydride of the lower fatty acid. I may use an amount of the mildly basic catalyst within the range of about 0.1% to about 25% by weight of the terpin present, and preferably an amount within the range of about 3% to about 12% by weight of the terpin present.

The terpin ester produced by this method may be recovered from the reaction mixture by washing the reaction mixture with water, a dilute mineral acid, for example, dilute hydrochloric acid, and then with water, and finally recovering the terpin ester as a water immiscible oil. Alternatively, the terpin ester may be recovered from the reaction mixture by distilling the volatile constituents from the terpin ester, at reduced pressure, if desired. When inorganic catalysts have been used in the reaction, they will largely crystallize out and may then be removed by filtration or decantation of the liquid product. Substantially complete removal of inorganic catalysts may be effected by diluting of the crude product obtained after distilling volatile materials from the reaction mixture with such organic solvents as benzene, petroleum ether, carbon tetrachloride, etc., filtering to remove the precipitate formed, and evaporating the added solvent.

The method in accordance with this invention is further illustrated by the following examples:

Example 1

Six hundred parts by weight of terpin, 1300 parts by weight of acetic anhydride and 50 parts by weight of anhydrous sodium acetate were heated for 136 hours at 95° C. and 18 hours at 110° C. The resulting reaction mixture was washed with water, with aqueous sodium carbonate and again with water, to yield 677 parts of terpin diacetate.

Example 2

Three hundred parts by weight of terpin, 450 parts by weight of acetic anhydride and 750 parts by weight of pyridine were allowed to stand 48 hours at 35° F., 16 hours at 90° C. and finally refluxed 16 hours. The reaction product was then washed with water, with dilute hydrochloric acid and finally with water to give an 86% yield (386 parts by weight) of terpin diacetate. This product gave the following analyses.

Saponification number_____ 348
Refractive index_____ 1.4555

Example 3

Terpin dibutyrate was prepared by heating 150 parts by weight of terpin, 200 parts by weight of butyric anhydride and 10 parts by weight of sodium acetate at 95° C. for 15 hours and then at 125° C. for 16 hours. The crude product was water washed, washed with aqueous sodium carbonate and finally with water, to yield 97 parts by weight of terpin dibutyrate. The terpin dibutyrate had the following properties:

Refractive index at 20° C_____ 1.465
Specific gravity at 15.6° C./15.6° C_____ 0.9551

*Example 4*

Terpin dipropionate was prepared by heating a mixture of 400 parts by weight of propionic anhydride, 300 parts by weight of terpin, and 20 parts by weight of anhydrous sodium acetate for 24 hours at 90–95° C. for 16 hours at 110° C., and finally for 8 hours at 125° C. The reaction mass was cooled to room temperature, washed with water, then washed with a water solution of sodium carbonate, and again washed with water. The product was filtered and dried by heating at 100° C., at a slightly reduced pressure. As a result of this treatment, 264 parts by weight of terpin dipropionate were obtained, the product having the following properties:

Refractive index at 20° C_____ 1.463
Specific gravity at 15.6° C./15.6° C_____ 0.9880

It will be appreciated that the method in accordance with this invention may be utilized to prepare chemically mixed lower fatty acid terpin esters such as terpin acetate-butyrate, terpin acetate-propionate, terpin butyrate-propionate, etc. Instead of a single fatty acid anhydride, two fatty acid anhydrides may be used in equimolecular proportion, or, if desired, an additional slight excess of the anhydride having the higher molecular weight may be used. Chemically mixed fatty acid anhydride may also be used in an equivalent manner.

The terpin esters produced in accordance with this invention are valuable insecticides. They are also solvents for nitrocellulose and cellulose acetate, and therefore valuable in the formulation of cellulose ester compositions in which relatively high boiling solvents are desired.

It will be understood that the details and examples given hereinbefore are illustrative only and in no way limiting on my invention as broadly described hereinbefore and in the appended claims.

What I claim and desire to protect by Letters Patent is:

1. Terpin dibutyrate.
2. Terpin acetate-butyrate.
3. A method for the preparation of a terpin lower fatty acid ester which comprises reacting terpin with the anhydride of a lower fatty acid in the presence of a mildly basic catalyst.
4. A method for the preparation of a terpin lower fatty acid ester which comprises reacting terpin with the anhydride of a lower fatty acid in the presence of a mildly basic inorganic salt.
5. A method for the preparation of a terpin lower fatty acid ester which comprises reacting terpin with the anhydride of a lower fatty acid in the presence of a weak organic base.
6. A method for the preparation of a terpin lower fatty acid ester which comprises reacting terpin with the anhydride of a lower fatty acid in the presence of sodium acetate.
7. A method for the preparation of a terpin lower fatty acid ester which comprises reacting terpin with the anhydride of a lower fatty acid in the presence of pyridine.
8. A method for the preparation of a terpin lower fatty acid ester which comprises reacting terpin with two lower fatty acid anhydrides in the presence of a mildly basic catalyst.
9. A method for the preparation of a terpin lower fatty acid ester which comprises reacting terpin with two lower fatty acid anhydrides in the presence of sodium acetate.
10. A butyrate ester of terpin.
11. A method for the preparation of terpin diacetate which comprises reacting terpin with acetic anhydride in the presence of a mildly basic catalyst.
12. A method for the preparation of terpin diacetate which comprises reacting terpin with acetic anhydride in the presence of sodium acetate.
13. A method for the preparation of terpin diacetate which comprises reacting terpin with acetic anhydride in the presence of pyridine.

JOSEPH N. BORGLIN.